(12) United States Patent
Ashbaugh

(10) Patent No.: US 6,962,148 B1  
(45) Date of Patent: Nov. 8, 2005

(54) PORTABLE CAMPFIRE CONTAINER

(76) Inventor: Floyd Ashbaugh, 19445 Highridge Way, Trabuco Canyon, CA (US) 92679

( * ) Notice: Subject to any disclaimer, the term of this patent is extended or adjusted under 35 U.S.C. 154(b) by 80 days.

(21) Appl. No.: 10/839,669

(22) Filed: May 5, 2004

(51) Int. Cl.⁷ .............................. F24C 3/00
(52) U.S. Cl. ................................ 126/250
(58) Field of Search ................ 126/9 R, 25 R, 126/29, 250; D7/332

(56) References Cited

U.S. PATENT DOCUMENTS

| | | | |
|---|---|---|---|
| 2,538,811 A * | 1/1951 | Triggs ........................ 110/235 |
| 3,146,773 A | 9/1964 | Melzer | |
| 3,259,084 A * | 7/1966 | Hance ........................ 110/251 |
| D220,150 S | 3/1971 | Roestenburg | |
| 3,765,397 A * | 10/1973 | Henderson ................ 126/25 R |
| D258,259 S * | 2/1981 | Lindholm .................... D7/332 |
| D273,264 S * | 4/1984 | Elliston ....................... D7/332 |
| 4,794,906 A * | 1/1989 | Longley, Jr. ................ 126/9 R |
| 5,329,917 A | 7/1994 | Young | |
| 5,682,872 A * | 11/1997 | Whitted ....................... 126/29 |
| 5,785,046 A | 7/1998 | Colla | |
| D451,989 S | 12/2001 | Ashton | |
| 6,425,387 B1 | 7/2002 | Rohback, Jr. | |
| 6,532,950 B2 | 3/2003 | Meurer | |
| D476,403 S | 6/2003 | Goodrich | |
| 6,609,514 B1 | 8/2003 | Bertolas | |

* cited by examiner

*Primary Examiner*—Stephen Gravini

(57) ABSTRACT

A system, method and apparatus for a portable fire container comprising a single piece of non-flammable material, wherein the container has a solid bottom portion, the container has a contiguous side portion at least six inches in height, the side portion has holes, the container is adapted to contain combustible material during the combustion, and the container is adapted to contain the resulting residual ashes and embers.

11 Claims, 2 Drawing Sheets

PORTABLE CAMPFIRE CONTAINER

BACKGROUND OF THE INVENTION

The field of the invention pertains to fire containers, and particularly to a portable container for campfires.

When camping outdoors or participating in other outdoor activities, there is the need for a light weight yet rugged device that allows for efficient combustion of wood and other flammable material while remaining portable, self contained, and allowing for easy disposal of the resulting ashes. A typical application of this device would be a wood burning appliance about which people can group for the purpose of both getting warm and as a social focal point while camping or participating in other outdoor activities.

Numerous inventions have been disclosed for campfire related devices.

U.S. Pat. No. 3,146,773 is titled "Collapsible Portable Grill" is directed to a device with four side sections that may be separated for the purpose of storage. This device has a bottom section and holes in the side section, but is put together with interlocking side and bottom sections. The device is not cylindrical, requires assembly, does not optimize the complete combustion of the flammable material, and is not optimized for containing the residual ashes and embers from the flammable material.

U.S. Pat. No. 5,785,046 is titled "Portable Fire Pit" and is directed to a device with multiple folding side sections with holes, and a bottom section into which the unfolded side sections are placed for use. This device is constructed from multiple sections fitted together to allow for collapsing for portability and storage.

U.S. Pat. No. 6,609,514 is titled "Portable Fire Pit and Fire Pit Stand." It is directed to a portable fire pit includes an elevated platform, a fire pit, at least one container of fuel, and at least one support device. The at least one support device is attached to the elevated platform. The fire pit is retained within the elevated platform. The fuel is placed in the fire pit. At least one decorative item may be placed in the fire pit, around the fuel. The fuel is ignited. A fire pit stand includes a pedestal, a fire pit, at least one container of fuel and a cover. The fire pit is retained in a top of the pedestal. The fuel is placed in the fire pit. The cover is suspended over the pedestal with any appropriate method. The fuel is ignited to display a large flame.

U.S. Pat. No. 6,532,950 is titled "Fire Ring Assembly" and is directed to a device of three interlocking side sections. The side sections can contain holes, but there is no bottom section. U.S. Pat. No. 5,329,917 is also of multiple section construction and is titled "Fire Ring". This device also is intended to collapse for portability, may contain some holes in the side sections, but does not have a bottom section. A "Portable Device for Containing a Campfire Within" is described in U.S. Pat. No. 6,425,387. It is a device with multiple side sections, but no bottom section. These fire ring devices risk causing wild fires and leave unsightly ashes at the campsite after the fire is extinguished.

U.S. Pat. No. D476,403 discloses a "Portable Fire Container." The device is a multiple section device put together with interlocking sections. The device has a solid metal cover over the top and thus prevents view of the campfire except through small holes.

U.S. Pat. No. D451,989 discloses a portable fireplace. The device is not suitable for easy portability to a campsite.

A problem with some campfires is embers starting wild fires. Accordingly, there is a need for a portable fire container that prevents embers from reaching tree roots or other vegetation. In addition, burning fires in the wilderness will leave blacken rocks and a pile of charcoal and ashes. And easy solution is to contain the fire in a one-piece container that will allow for efficient burning of the combustible material while not leaving any blackened rocks in the fire ring, and allowing easy disposal of the resulting ashes.

Many National Parks and recreation areas no longer allow for any fires due to air pollution. Accordingly, there is a need for a fire container that efficiently burns the combustible material with either minimal or no visible smoke.

The design and manufacture of the portable campfire container is a single piece construction with a solid bottom for the containment of the fire, combustion material, embers, and resulting ashes. The design also includes sides to help contain the fire and ashes within. The ratio of the height of the sides to the width of the bottom is such as to allow efficient containment of the fire and ease of portability. In addition, the sides also contain holes for the purpose of allowing efficient oxidation of the combustible material and pleasing visual appearance while a fire is burning within the appliance. The container cannot be collapsed, folded, or disassembled and retains its shape at all times. The container can be fitted with a screen on the top for the purpose of arresting sparks as required for some applications. In addition, the container can be fitted with a grill for the purposes of cooking.

Accordingly, one of the primary objectives of the present invention is the provision of a portable fire container that may be used as a focal point to provide warmth and a pleasant visual impression to those gathered about the fire container when the device is charged with a combustible material such as wood logs.

Another object of the invention is the provision of a portable fire container that is a compact lightweight structure for storage purposes and/or transport in a vehicle.

Another object of the invention is the provision of a portable fire container that includes a grill for cooking.

BRIEF SUMMARY OF THE INVENTION

An aspect of the present invention provides a method for efficient burning of a campfire.

Another aspect of the present invention provides a portable fire container.

Another aspect of the present invention provides a means of containing the campfire made up of the combustible material, fire, embers, and resulting ashes in a safe and tidy manner.

Another aspect of the present invention provides an easy method to dispose of the remaining ashes and charcoal when the combustion is finished.

BRIEF DESCRIPTION OF THE DRAWINGS

The following discussion may be best understood with reference to the various views of the drawings, described in summary below, which form a part of this disclosure.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided as illustrations so that this disclosure will be thorough and complete, and will fully convey the scope of the invention to those skilled in the art. Like numbers refer to like elements throughout all drawings.

Figure 1:
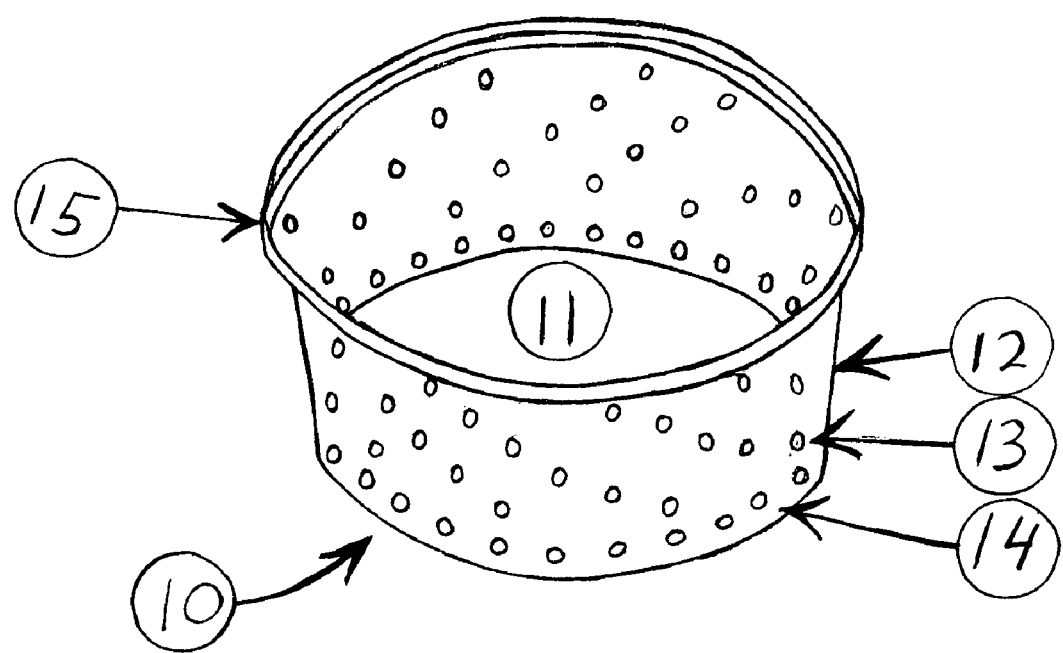
FIG. 1 is a perspective view showing one example of the portable fire container.

In reference to FIG. 1, portable fire container 10 has both a bottom portion 11 and side walls 12. Holes 13 pass completely through side walls 12 and start 14 over an inch above bottom portion 11. There are no holes in the bottom portion 11. There are more holes at 14 just above the bottom portion 11 in a ring to provide air to the combustible material and resulting embers in a tighter pattern. On the rest of the side walls 12 is an even distribution of holes 13 to provide air to the resulting flames produced by the combustion. The holes 13 can be arranged in various patterns to display images if desired when viewed with a fire contained within the Portable Fire Container 10. A lip 15 can be formed at the top of the side walls 12 and can be used for several purposes such as fitting a grill for cooking and heating food, or for attaching a screen for purposes of arresting sparks. The Portable Fire Container 10 is shown as a cylinder, with the bottom portion 11 as round, but can be fabricated to take the shape of a polygon as well.

Figure 2:
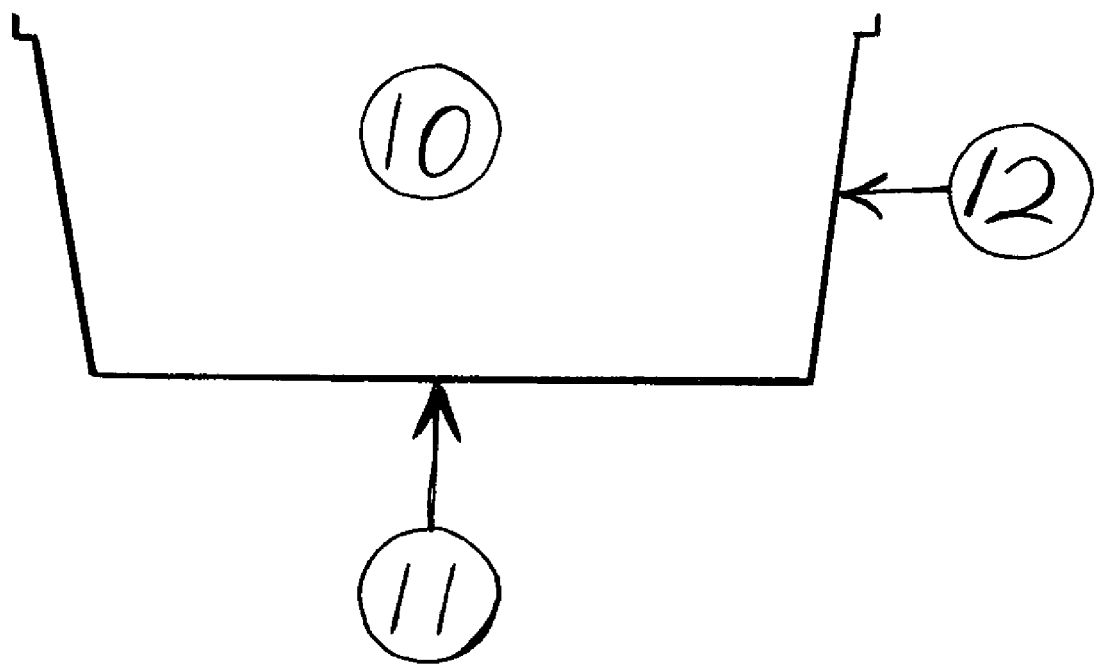
FIG. 2 is another perspective view showing a cut away side view of one example of the portable fire container.

In reference to FIG. 2, a cut away side view of the Portable Fire Container 10 is shown, which contains the both the bottom portion 11 and the side walls 12. In addition, detail of the lip 15 is shown. The taper of the side walls 12 is also apparent for purposes of stacking multiple Portable Fire Containers. The ratio of the height of the side walls 12 to the diameter of the bottom 11 as shown in FIG. 2 is approximately 1 to 2, but the ratio can be set to other configurations as well.

In a preferred implementation of the method of the current invention, wood is placed between the side walls 12 and above bottom portion 11 and ignited. As the combustion proceeds, air comes through the holes 13 and 14 to provide the fire with just enough oxygen to efficiently combust the combustible material, but to also slow the flames to extend the burning time of the combustible material.

The non-flammable material is preferably a metal, but can include any material capable of withstanding temperatures generated by a small fire. More preferably, the non-flammable material is coated with a high-temperature enamel to prevent corrosion.

I have discovered that the ¼ to ½ inch holes, spaced at regular intervals as shown in FIG. 1, causes efficient combustion of wood with minimal or no visible smoke. A cylindrical shaped container is most efficient for combustion.

One example of a portable fire container is made by use of a smudge pot base. Seventy holes of approximately ⅜ inch diameter were drilled at regular intervals in the side portion. The holes were drilled at least 1½ inches above the base portion. The solid base portion is 17 inches in diameter. The side portion of the container is 10 inches tall. The side portion tapers from 17 inches in diameter at the base portion to 19 inches in diameter to just below the lip portion. Above the lip portion, the side portion diameter is 20 inches. The ration of the surface area of the holes to the surface area of the non-flammable side portion material is approximately 5%.

While the present invention has been described in terms of certain preferred implementations, those of ordinary skill in the art will appreciate that certain variations, extensions and modifications may be made without varying from the basic teachings of the present invention. As such, the present invention is not to be limited to the specific preferred implementations described herein. Rather, the scope of the present invention is to be determined from the claims, which follow.

What is claimed is:

1. A portable fire container comprising:
   a single piece of non-flammable material;
   wherein the container is of a cylindrical or near cylindrical shape with side portions perpendicular within plus of minus fifteen degrees to the end portions of the cylinder,
   wherein the said container has a circular or oval cross section as viewed through the body of the cylinder parallel to the end portions,
   wherein the said container has one end portion that is open and one end portion that is closed,
   wherein the container has a contiguous side portion between six inches to 24 inches in height as defined to be the minimum linear dimension between the container end portions,
   wherein the container has end portion dimensions between ten inches to 30 inches in the greatest linear dimension,
   wherein the container side portion has multiple holes with each hole no greater than 2 square inches in size,
   wherein the ratio of the surface area of the container side portion holes to the surface area of the side portion is between 2% and 20%,
   wherein the container is adapted to contain combustible material during the combustion, and wherein the container is adapted to contain the resulting residual ashes and embers.

2. The portable fire container of claim 1, wherein the non-flammable material is coated with a corrosive resistant material.

3. The portable fire container of claim 1, wherein the ratio of the height of the side portion of the container as defined to be the minimum linear dimension between said container end portions, to the greatest linear of the closed end portion of said container, is approximately between 1:1.5 and 1:3.

4. The portable fire container of claim 1, wherein the side portion is tapered to allow for efficient stacking of multiple containers.

5. The portable fire container of claim 4,
   wherein the container is cylindrical in shape,
   wherein the container side portion is approximately 10 inches tall as defined to be the minimum linear dimension between the container end portions,
   wherein the container end portion that is closed is approximately 17 inches in the greatest linear dimension,
   wherein the container end portion that is open is approximately 20 inches in the greatest linear dimension,
   wherein the holes are located throughout the container side portion but are no closer then one inch to the container closed end portion,
   wherein the ratio of the surface area of the container side portion holes to the surface area of the side portion is approximately 5%.

6. A method of starting a fire, comprising:
   placing a combustible material inside a portable fire container,
   igniting the combustible material;
   wherein the container is cylindrical in shape, wherein the container has one end portion that is closed and one end portion that is open, wherein the container has a contiguous side portion between six inches to 24 inches in height as defined to be the minimum linear dimension between the container end portions, wherein the container has an end portion dimension between ten inches to 30 inches in the greatest linear dimension, wherein the container side portion has multiple holes with each hole no greater then 2 square inches in size, wherein the container is adapted to contain the combustible material during the combustion, and wherein the container is adapted to contain resulting residual ashes and embers produced by the combustion of the combustible material.

7. The method of starting a fire of claim 6, wherein the combustible material is wood.

8. The method of starting a fire of claim 6, wherein the ratio of the height of the side portion of the container as defined to be the minimum linear dimension between said container end portions, to the greatest linear dimension of the closed end portion of said container, is approximately between 1:1.5 and 1:3.

9. The method of starting a fire of claim 6, wherein the container is cylindrical in shape, wherein the container side portion is approximately 10 inches tall as defined to be the minimum linear dimension between the container end portions, wherein the container end portion that is closed is approximately 17 inches in the greatest linear dimension, wherein the container end portion that is open is approximately 20 inches in the greatest linear dimension, wherein the holes are located throughout the container side portion but are no closer then one inch to the container closed end portion, wherein the ratio of the surface area of the container side portion holes to the surface area of the side portion is approximately 5%.

10. A portable fire container comprising:

a near cylindrical shaped container with a top surface opening wider then a bottom surface to form a taper shape from the top surface to the bottom surface;

combustible material placed inside said cylindrical shaped container;

walls of said cylindrical shaped container having a greater number of holes in a lower portion of said container then an upper portion of said container, wherein the greater number of holes provide air to combustible material placed inside said container resulting in a tighter pattern of embers and said upper portion allowing air flow to resulting flames produced by combustion;

less then 1 inch diameter but grater then one quarter inch diameter holes on said container walls spaced at regular intervals causing efficient combustion of wood with minimal or no visible smoke;

a top portion including any one of a screen portion fitting and covering said container arresting sparks produced by said combustible material and a grill fitting;

a lip portion formed at said top surface allowing said screen portion attachment or said grill fitting or cooking of food.

11. A portable fire container of claim 10, wherein the said container is coated with a nonflammable corrosive resistant coating.

\* \* \* \* \*

UNITED STATES PATENT AND TRADEMARK OFFICE
CERTIFICATE OF CORRECTION

PATENT NO.        : 6,962,148 B1
APPLICATION NO.   : 10/839669
DATED             : November 8, 2005
INVENTOR(S)       : Floyd Ashbaugh It is certified that error appears in the above-identified patent and that said Letters Patent is hereby corrected as shown below:

In claim 1, the issued patent reads "1. A portable fire container comprising: a single piece of non-flammable material; wherein the container is of a cylindrical or near cylindrical shape with side portions perpendicular within plus of minus fifteen degrees…"

The typographical error occurred in the last "of" which should have been --or--.

The corrected claim 1 should read --1. A portable fire container comprising: a single piece of non-flammable material; wherein the container is of a cylindrical or near cylindrical shape with side portions perpendicular within plus or minus fifteen degrees…--

Signed and Sealed this

Fifth Day of August, 2008

JON W. DUDAS
*Director of the United States Patent and Trademark Office*

UNITED STATES PATENT AND TRADEMARK OFFICE
CERTIFICATE OF CORRECTION

PATENT NO.         : 6,962,148 B1
APPLICATION NO. : 10/839669
DATED                 : November 8, 2005
INVENTOR(S)       : Floyd Ashbaugh Page 1 of 1

It is certified that error appears in the above-identified patent and that said Letters Patent is hereby corrected as shown below:

Column 4, lines 8-12 in claim 1, the issued patent reads "1. A portable fire container comprising: a single piece of non-flammable material; wherein the container is of a cylindrical or near cylindrical shape with side portions perpendicular within plus of minus fifteen degrees…"

The typographical error occurred in the last "of" which should have been --or--.

The corrected claim 1 should read --1. A portable fire container comprising: a single piece of non-flammable material; wherein the container is of a cylindrical or near cylindrical shape with side portions perpendicular within plus or minus fifteen degrees…--

This certificate supersedes the Certificate of Correction issued August 5, 2008.

Signed and Sealed this

Twenty-sixth Day of August, 2008

JON W. DUDAS
*Director of the United States Patent and Trademark Office*